July 8, 1924. 1,500,855
C. G. TURNER
OVEN AND DISPLAY DEVICE
Filed July 20, 1921    2 Sheets-Sheet 1
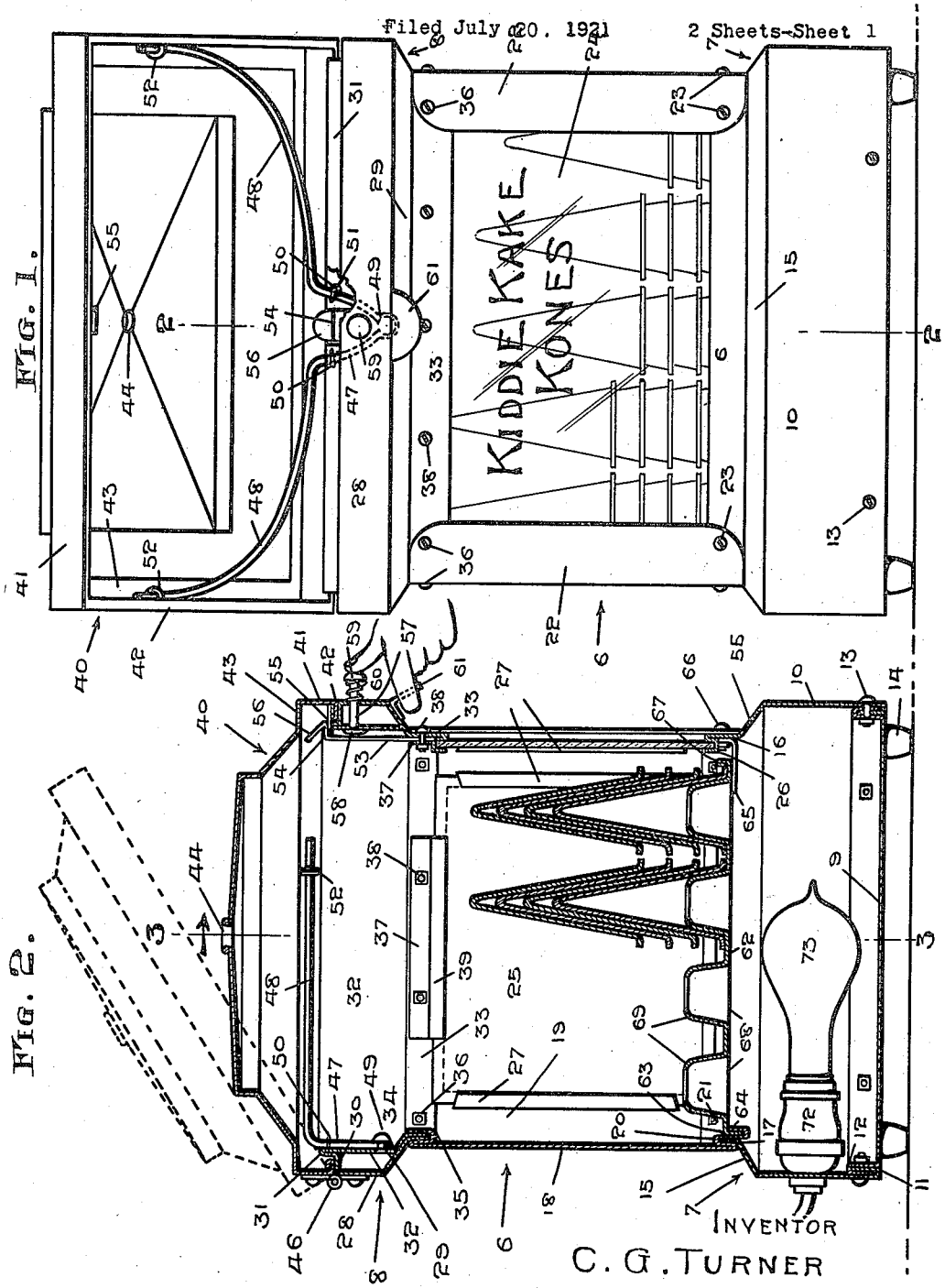
INVENTOR
C. G. TURNER
by W. J. Fitz Gerald
ATTORNEY July 8, 1924.
C. G. TURNER
1,500,855
OVEN AND DISPLAY DEVICE
Filed July 20, 1921   2 Sheets-Sheet 2
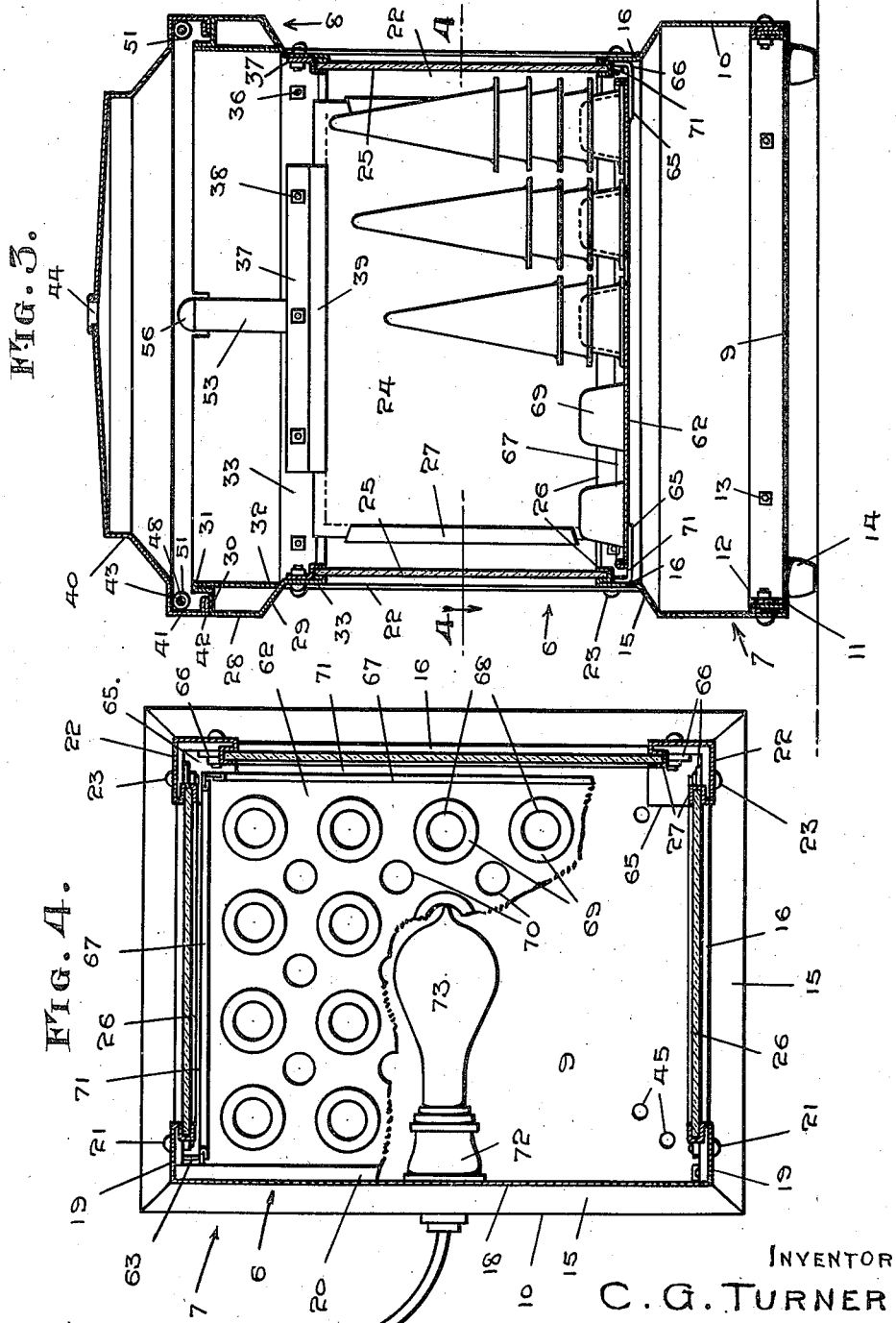
INVENTOR
C.G.TURNER
by W. J. Fitz Gerald & Co.
ATTORNEY

Patented July 8, 1924.

1,500,855

UNITED STATES PATENT OFFICE.

CHARLES GAINER TURNER, OF ATLANTA, GEORGIA.

OVEN AND DISPLAY DEVICE.

Application filed July 20, 1921. Serial No. 486,304.

*To all whom it may concern:*

Be it known that I, CHARLES GAINER TURNER, a citizen of the United States, residing at Atlanta, in the county of Fulton and State of Georgia, have invented certain new and useful Improvements in Oven and Display Devices; and I do hereby declare the following to be a full, clear, and exact description of the invention, such as will enable others skilled in the art to which it appertains to make and use the same.

The present invention relates to a device for containing and holding ice cream cones or other cup pastry articles, or the like, for warming the cones or articles and also displaying and advertising them, thereby not only promoting the sale of the articles, but also rendering them more crisp and fresh, this invention being an improvement over the device disclosed in my copending application filed August 18, 1920, Serial No. 404,345.

The object of this invention, in addition to the objects brought out in the aforesaid application, is to improve the construction generally in its details, to enhance the utility and efficiency thereof.

One of the more specific objects is the provision of novel means whereby the cover or top of the casing, when released, will swing open automatically and will assume an open position which permits the hand to reach into the casing and remove the cones conveniently, such means preventing the cover or top from swinging back too far as would be likely to break a mirror or other object in front of which the device is placed.

Another object is the provision of a novel latching means for the cover which can be conveniently operated by one hand for releasing the cover to obtain access to the cones or other articles within the casing.

A further object is to improve the construction of the casing itself, to enable same to be readily manufactured, and to render the casing substantial in construction and ornate in appearance, as well as practical for the intended purposes.

A still further object is the provision of novel means for supporting the shelf in the casing on which the cones or other articles are supported.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is a front view of the improved container, with the cover or top open.

Fig. 2 is a vertical section on the line 2—2 of Fig. 1 showing the cover closed in full lines and open in dotted lines.

Fig. 3 is a vertical section on the line 3—3 of Fig. 2.

Fig. 4 is a horizontal section on the line 4—4 of Fig. 3, a portion of the shelf being broken away.

The device, generally considered, is somewhat similar to the one disclosed in the application hereinbefore referred to, but the construction is improved to accomplish the desired results in a more satisfactory manner. The casing is of rectangular outline and comprises the intermediate portion 6, the base portion 7 and the rim portion 8. The base and rim portions 7 and 8 are of slightly larger outline than the intermediate portion for purpose of strength and appearance. The base portion 7 comprises the sheet metal bottom 9 and the wall member 10 having front, side and back walls. The member 10 is also of sheet metal and has its lower edge portion bent back inwardly, as at 11, while the edge portion of the bottom is bent upwardly, outwardly and downwardly, as at 12, to engage over and behind the portion 11, and bolts 13 extend through the portions 11 and 12, for securing the member 10 and the bottom 9 together. Feet 14 of rubber or other suitable material are secured to the bottom 9 near the corners for supporting the casing on a counter, shelf, or other support, with the bottom raised off the surface, for the circulation of air under the bottom. The upper edge portion of the member 10 is contracted or offset inwardly, forming the inclined shoulders 15. The front and side upper edge portions or flanges 16 and the rear upper edge portion or flange 17 rise from the respective shoulders 15 for the attachment of the intermediate portion.

The intermediate portion 6 of the casing includes a back 18 of sheet metal having its vertical edge portions bent forwardly to form flanges 19 which form part of the sides of said intermediate portion. The lower edge portion of the back 18 is bent back upwardly and then downwardly on the inside, as at 20, to engage and fit over the flange 17, and the lower end portions of the flanges 19 overlap the rear end portions of the side flanges 16 and are secured thereto by means of bolts 21 or the like. Upright angle members or posts 22 are disposed at the front corners, and are composed of sheet metal, with their lower end portions overlapping the flanges 16 at the forward corners and secured to said flanges by means of bolts 23 or the like extending through the flanges 16 and the flanges of the members 22. The intermediate portion 6 of the casing has a front opening between the members 22, and side openings between said members 22 and the flanges 19 of the back, and the front and side panels 24 and 25, respectively, extend across said openings within the casing. Such panels are of glass or other transparent material, in order to display the cones or other contents of the container for observation. The flanges 16 are bent back inwardly and upwardly at the lower edges of the openings to form grooved seats 26 in which the lower edges of the panels 24 and 25 are seatable, for supporting them, and the vertical edges of the members 22 and flanges 19 are similarly bent back inwardly and doubled to form vertical guides 27 to receive the vertical edges of the panels when they are slid downwardly into place.

The rim portion 8 of the casing is mounted on the back 18 and members 22, and is also of sheet metal. The rim portion 8 has the outer vertical rectangular member 28 with shoulders 29 extending inwardly and downwardly at an angle from the lower edges thereof, and a seat 30 extends inwardly from the upper edge of the member 28. At the inner edge of the seat 30, the metal is doubled and bent to form an upstanding lip 31 surrounding the opening or mouth of the casing, and from the lip 31, the metal extends downwardly, as at 32, and is secured to the shoulders 29, thus providing a double wall hollow rim. The front and side shoulders 29 have the depending flanges 33 and the rear shoulder 29 has the depending flange 34, which flanges are offset inwardly similarly to the flanges 16 and 17 of the base portion 7 to correspond with the intermediate portion 6 of the casing. The upper edge portion of the back 18 is bent downwardly and then upwardly on the inside, as at 35, to receive the flange 34. The upper terminals of the members 22 and flanges 19 overlap the flanges 33 at the corners of the casing and bolts 36 extend through the overlapping parts for clamping them together, thereby securing the rim portion 8 on the intermediate portion 6. After the panels 24 and 25 have been inserted, retainer strips 37 are secured by means of bolts 38 or the like to the flanges 33 on the inside over the upper edges of panels, and have depending offset lips 39 to engage over and overlap the upper edge portions of said panels for holding them down in place.

The front panel 24, and also the side panels 25, can have suitable signs or advertising matter printed or otherwise provided thereon, for purpose of advertisement and to call attention to the display.

The cover or top 40 of the casing is also of sheet metal and has the rim 41 with a bead 42 to bear on the seat 30 around the lip 31, and said cover has a shoulder 43 above the rim 41. The cover also has a central raised portion with a central aperture 44 for ventilation. The bottom 9 also has ventilating apertures 45 near the corners, in order that the air can enter from below the bottom through the apertures 45 to flow upwardly within the casing and out through the aperture 44. The cones are thus ventilated by the upward flow of air through and past them. The cover 40 has its rear edge portion hinged, as at 46, to the rear portion of the member 28, so that the cover can swing open upwardly and rearwardly.

Means is provided for automatically raising the cover, when it is released, and for supporting the cover in open position and also limiting the rearward swinging movement thereof without an abrupt stop, such as would produce a jar or shock, as might be liable to break the cones or other articles in the container or to cause other damage. For this purpose, a wire spring is used, having a V-shaped intermediate portion 47 and curved arms 48 diverging forwardly from the portion 47. The crotch of the portion 47 is engaged by a rivet or other securing member 49 engaging the rear wall of the portion 32 and said rivet clamps said portion 47 of the spring. Bands or wires 50 also embrace the portion 47 and engage through apertures 51 in the lip 31 at the rear of the casing. The intermediate portion 47 of the spring is thus rigidly secured to the rear portion of the rim member or portion 8 of the casing, and the terminals of the arms 48 extend under the shoulders 43 of the cover or top 40 at the sides and pass slidably through eyes 52 secured to the cover under said shoulders 43. The arms 48, when the cover is released, will raise the cover to an inclined position, as seen in dotted lines in Fig. 2, thereby supporting the cover yieldingly in such open position. Furthermore, when the cover is released and swings upwardly under the influence of the spring arms 48, it may swing upwardly to approach a vertical position, and such upward and backward movement is retarded by the springs to prevent the cover from flying or swinging back and striking a mirror, glass or other object in front of which the device may be disposed. The cover, after a few oscillations, will come to rest in its open position, as seen in Fig. 1, so that the hand can be readily moved under the cover for access into the casing to remove one or more cones or articles. In this manner, the cover will open automatically when released, and its movement is limited by the spring, without a jar or shock, to provide for smooth action, without injury to the contents.

The latch 53 for holding the cover closed comprises an upstanding leaf spring having its lower terminal secured between the front flange 33 and strip 37 by one of the bolts 38. Said latch projects upwardly behind the front wall of the rim portion 8, and has a catch portion 54 extending at an angle forwardly to engage over a keeper piece 55 secured on the bead 42 of the cover at the front edge thereof. The portion 54 has an inclined surface 56 to be engaged by the piece 55, when the cover is closed, for pressing the latch back so that it will snap over the piece 55, and thereby holding the cover down on the casing and the spring arms 48 under tension.

In order to conveniently disengage the latch from the cover, a plunger 57 is slidable through the members 28 and 32 of the rim portion 8 at the front of the casing and in front of the latch. The plunger 57 has a button 58 at its rear end behind the front part of the rim portion 8 to move rearwardly against the latch 53, and said plunger has a push button 59 at its forward protruding end to be pressed by the thumb or finger, thereby shoving the latch rearwardly to remove it from the keeper piece 55 and release the cover. The plunger 57 is normally retracted by means of a light coiled expansion spring 60 surrounding the plunger and confined between the button 59 and rim portion 8. An ear 61 is secured to the front shoulder 29 and extends downwardly and outwardly to provide a finger hold behind which the forefinger can be engaged to obtain a grip so that the thumb can be used for pushing the plunger 57 rearwardly, as seen in Fig. 2, to release the cover. It is thus a convenient matter to disengage the latch from the cover by one hand, without jarring or shaking the container.

A shelf or false bottom 62 is supported within the casing above the bottom thereof. The rear edge of the shelf 62 has a downturned flange or lip 63 engaged and seated within a doubled and bent back portion 64 formed in the portion 20 of the back 18, while the forward corners of the shelf are seatable on supporting pieces 65 at the front corners of the casing. Said pieces 65 have upturned flanges or ears 66 which are engaged by the bolts 23 within the front corners of the casing. Thus, by inserting the shelf 62 and placing the flange or lip 63 thereof into the grooved seat portion 64, the shelf is properly positioned, and the front corners thereof will seat on the pieces 65, thereby supporting the shelf at the juncture of the intermediate and base portions of the casing. The shelf 62 has openings 68 with tapered lips 69 surrounding said openings and rising from the shelf, for holding the cones or other cup pastry upright on the shelf, such cones or pastry being nested one on the other, in stacks with their mouths or open ends down. The lowermost cones or pastry of the stacks fit down around the lips 69 for maintaining the stacks upright, and retaining them in position on the shelf. The shelf thus affords means for holding and supporting the cones or cup pastry, and the light rays as well as heat can pass upwardly through the openings 68 for heating and illuminating the cones from the interior, such cones being usually semi-transparent. The shelf also has openings 70 between the lips 69 for the upward passage of light rays and heat to illuminate and heat the cones or articles from the exterior. Air can also flow upwardly through the openings 68 and 70 to pass upwardly through and past the cones or articles for ventilating them, and the air being heated will also assist in drying the cones by passing upwardly as stated. The forward and side edges of the shelf 62 are spaced from the front and side walls of the casing, to leave slots 71 at the lower edges of the panels 24 and 25 through which the light rays can pass upwardly to the panels for illuminating the signs thereon.

The heat and light rays are supplied by an electric lamp 73 disposed within the base portion 7 of the casing under the shelf 62 and carried by a socket 72 secured to the wall member 10, preferably at the rear.

The cones or cup pastry can be readily stacked on the shelf, over the openings 68 and lips 69, with such cones or articles in inverted position, and the lamp 73 being lighted will direct light and heat rays upwardly through the openings in the shelf, for illuminating and heating the cones both on the interior and exterior. Air also flows upwardly through the casing from the inlet apertures 45 to and out through the outlet aperture 44, and such air is heated by the lamp under the partition and flows upwardly through the openings 68 and 70. Such heated air will flow upwardly through and around the cones or articles for drying and heating them, to make them more palatable. The cones or articles are illuminated, to afford an attractive display, and the panels 24 and 25 are also illuminated, to add to the attractiveness of the display. By serving the cones or pastry warm, they are more tasty and appetizing, and other advantages are also obtained. Ice cream will stick to warm cones, whereas it will frequently fall from cones which are cold or soggy. Furthermore, the ice cream will melt and drop down the cone as it is eaten away, making it unnecessary to pack the cone with ice cream and also making the ice cream last to the small end of the cone.

In using the container, it is placed at a convenient position, where it will attract attention, to stimulate sales. In serving the cones, it is a convenient matter to manipulate the ice cream scoop in one hand, and to release the latch 53 from the cover by the other hand to withdraw the cone from the casing, the cover springing open so that ready access into the casing can be had. Although the cover will swing open automatically when released, it will not fly back too far to strike or break an object in rear, and the cover will come to rest in an inclined position without shaking or jarring the cones or other contents. When the cone or article has been removed, the cover can be pushed or slammed down, and will be caught and held in closed position by the latch 53. The cones or articles are also kept clean and sanitary, and are protected from flies, dirt, dust and the like.

The inner surfaces of the casing are polished or otherwise finished so as to reflect the light rays, in order to make the illumination of the cones or articles and panels more effective, as well as directing the light and heat rays to the articles.

Having thus described the invention, what is claimed as new is:—

1. A container for pastry and other articles comprising a casing, a cover for the casing hinged to one wall thereof, a spring secured to said wall and having an arm extending away from said wall under the cover, the cover having a portion through which said arm is slidable, said arm serving to raise the cover, to yieldingly limit the opening movement thereof and to hold the cover open in inclined position, and a latch for holding the cover closed.

2. A container for pastry and other articles comprising a casing, a cover for the casing hinged to one wall thereof, a wire spring having an intermediate portion secured to said wall and diverging spring arms extending away from said wall under the cover, the cover having portions through which said arms are slidable, and said arms serving to raise the cover, to yieldingly limit the opening movement thereof and to hold the cover open in an inclined position, and a latch for holding the cover closed.

3. A container for pastry and other articles comprising a casing having a sheet metal rim portion with an outer wall member, a shoulder extending inwardly from the lower edge of said member, a seat extending inwardly from the upper edge of said member, a lip extending upwardly from the inner edge of said seat around the mouth of the casing, and a portion extending downwardly from the lip and secured to said shoulder, and a cover hinged to one wall of the casing to bear on said seat around said lip.

In testimony whereof I have signed by name to this specification in the presence of two subscribing witnesses.

CHARLES GAINER TURNER.

Witnesses:
 CHAS. W. BROOKS, Jr.,
 RITA BREMLETT.